US008752976B2

(12) United States Patent
Pickard (10) Patent No.: US 8,752,976 B2
(45) Date of Patent: Jun. 17, 2014

(54) LIGHT FIXTURE WITH CO-FORMED PLENUM COMPONENT

(75) Inventor: Paul Kenneth Pickard, Morrisville, NC (US)

(73) Assignee: Cree, Inc., Durham, NC (US)

( * ) Notice: Subject to any disclaimer, the term of this patent is extended or adjusted under 35 U.S.C. 154(b) by 106 days.

(21) Appl. No.: 13/338,582

(22) Filed: Dec. 28, 2011

(65) Prior Publication Data

US 2013/0021803 A1 Jan. 24, 2013

Related U.S. Application Data

(60) Provisional application No. 61/511,069, filed on Jul. 24, 2011.

(51) Int. Cl.
*F21S 8/02* (2006.01)
*F21V 7/22* (2006.01)

(52) U.S. Cl.
USPC .. 362/147; 362/231; 362/217.05; 362/296.02

(58) Field of Classification Search
USPC ............... 362/231, 217.05, 296.02, 219, 224, 362/147, 148; 264/1.9
See application file for complete search history.

(56) References Cited

U.S. PATENT DOCUMENTS

| 5,394,317 | A | 2/1995 | Grenga et al. |
| 6,508,567 | B1* | 1/2003 | Fiene ............................. 362/147 |
| 7,109,647 | B2* | 9/2006 | Jung ........................... 313/477 R |
| 7,213,940 | B1 | 5/2007 | Van De Ven et al. |
| 7,690,808 | B2* | 4/2010 | Yoon ............................. 362/147 |
| 8,066,404 | B2* | 11/2011 | Song et al. ..................... 362/219 |
| 8,376,578 | B2* | 2/2013 | Kong et al. ............... 362/249.02 |
| 2004/0251804 | A1 | 12/2004 | McCullough et al. |
| 2006/0159926 | A1 | 7/2006 | Funaki et al. |
| 2007/0267983 | A1* | 11/2007 | Van De Ven et al. ......... 315/294 |
| 2008/0116667 | A1* | 5/2008 | Schulze ..................... 280/728.1 |
| 2008/0278943 | A1 | 11/2008 | Van Der Poel |
| 2009/0201676 | A1* | 8/2009 | Eynden .......................... 362/225 |
| 2009/0251892 | A1* | 10/2009 | Hatti et al. ..................... 362/183 |
| 2010/0327768 | A1 | 12/2010 | Kong et al. |
| 2011/0025947 | A1* | 2/2011 | Thompson et al. ............. 349/62 |

FOREIGN PATENT DOCUMENTS

| DE | 102007030186 A1 | 1/2009 |
| EP | 0404463 B1 | 6/1996 |
| JP | 2003154621 | 5/2003 |
| JP | 2003155405 | 5/2003 |

OTHER PUBLICATIONS

Snell, et al., U.S. Appl. No. 13/189,535, filed Jul. 24, 2011.
Cree, Inc., International Application No. PCT/US2012/047502, International Search Report and Written Opinion, Oct. 17, 2012, 12 pages.

* cited by examiner

*Primary Examiner* — Peggy A. Neils
(74) *Attorney, Agent, or Firm* — Steven B. Phillips; Moore and Van Allen PLLC (57) ABSTRACT

A light fixture with co-formed plenum component is disclosed. Embodiments of the invention provide troffer-style recessed solid state fixture using a highly reflective plastic reflector. In at least some embodiments, the plastic reflector can meet the additional requirements placed on mechanical components exposed to the space above the ceiling plane in plenum return ceiling applications. Example embodiments include a light fixture with an LED light source and a reflector that is coextruded from a plenum rated substrate and a reflective material, for example, a plenum rated plastic substrate and a diffuse, white reflective material. In some embodiments, the plenum rated substrate includes polyetherimide, a polyphenylene ether/polystyrene blend, polycarbonate, polycarbonate copolymer, or a combination of the foregoing.

26 Claims, 6 Drawing Sheets

LIGHT FIXTURE WITH CO-FORMED PLENUM COMPONENT

CROSS-REFERENCE TO RELATED APPLICATION

This application claims priority from commonly assigned provisional patent application Ser. No. 61/511,069, filed Jul. 24, 2011, the entire disclosure of which is hereby incorporated herein by reference.

BACKGROUND

Light emitting diode (LED) lighting systems are becoming more prevalent as replacements for existing lighting systems. LEDs are an example of solid state lighting (SSL) and have advantages over traditional lighting solutions such as incandescent and fluorescent lighting because they use less energy, are more durable, operate longer, can be combined in multicolor arrays that can be controlled to deliver virtually any color light, and generally contain no lead or mercury. In many applications, one or more LED dies (or chips) are mounted within an LED package or on an LED module, which may make up part of a lighting unit, lamp, "light fixture" or more simply a "fixture," which includes one or more power supplies to power the LEDs. An LED fixture may be made with a form factor that allows it to replace a standard fixture or bulb. LEDs can also be used in place of florescent lights as backlights for displays.

For most LED lamps, LEDs may be selected to provide various light colors to combine to produce light output with a high color rendering index (CRI). The desired color mixing may be achieved, for example, using blue, green, amber, red and/or red-orange LED chips. One or more of the chips may be in a package with a phosphor or may otherwise have a locally applied phosphor. Translucent or transparent materials may be used with LED lighting fixtures to provide diffusion, color mixing, to otherwise direct the light, or to serve as an enclosure to protect the LEDs.

Rigid or semi-rigid materials may be included in a fixture or lamp as optical elements external to the LED modules themselves. Such optical elements may allow for localized mixing of colors, collimate light, and provide the minimum beam angle possible. Such optical elements may include reflectors, lenses, and/or lens plates. Reflectors can be, for example, of the metallic, mirrored type, in which light reflects of opaque silvered surfaces, or be made of or use white or near-white highly reflective material. Lenses can vary in complexity and level of optical effect, and can be or include traditional lenses, total internal reflection optics, or glass or plastic plates with or without coatings or additives.

SUMMARY

Embodiments of the present invention provide troffer-style recessed solid state lighting products using a highly reflective plastic reflectors. In at least some embodiments, a light fixture with a plastic reflector can meet the additional requirements placed on mechanical components exposed to the space above the ceiling plane in plenum return ceiling applications. Thus, a light fixture can be made of lower cost material, and/or be made larger than traditional metal troffers but can still be used in plenum ceiling environments.

Example embodiments of the present invention include a light fixture with an LED light source and a co-formed reflector to reflect at least some light from the light source. In some embodiments, the co-formed reflector is coextruded from a plenum rated substrate and a reflective material, for example, a plenum rated plastic substrate and a diffuse, white reflective material. In at least some embodiments the light fixture also includes a lens or lens arrangement including at least two lens plates. In at least some embodiments, the light fixture can include a pan disposed on the outside of the reflector to support the fixture, forming an in-ceiling, troffer-style light fixture.

In some embodiments, the plenum rated substrate for the co-formed reflector includes polyetherimide, a polyphenylene ether/polystyrene blend, polycarbonate, polycarbonate copolymer, or a combination of the foregoing. In some embodiments, a longer fixture can be assembled by using two, complimentary, portions of a co-formed reflector, where these portions are adapted to be joined end-to-end. In some such embodiments, reinforcing members can be used in the co-formed reflector.

In some embodiments of the invention, the LED light source includes an LED array with at least two groups of LEDs, wherein one group, if illuminated, would emit light having dominant wavelength from 440 to 480 nm, and another group, if illuminated, would emit light having a dominant wavelength from 605 to 630 nm. In some embodiments LEDs in one group are packaged with a phosphor, which, when excited, emits light having a dominant wavelength from 560 to 580 nm.

In some embodiments one group of LEDs, if illuminated, would emit light having dominant wavelength from 435 to 490 nm, and another group, if illuminated, would emit light having a dominant wavelength from 600 to 640 nm. In some embodiments LEDs in one group are packaged with a phosphor, which, when excited, emits light having a dominant wavelength from 540 to 585 nm.

A light fixture according to at least some embodiments of the invention can be made by co-forming a plenum rated reflector, fixing a plurality of LED devices to a heatsink to serve as a source of light for the light fixture, and positioning the heatsink with the light source so that at least a portion of the light is reflected from the plenum rated reflector. In some embodiments, the heat sink can be positioned between two lens plates that serve as the lens or lens portion of the reflector and lens assembly of the fixture. A pan may also be attached to the fixture to form an in-ceiling troffer-style fixture.

DETAILED DESCRIPTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

Co-forming can be used for portions of a light fixture according to example embodiments of the invention. Co-forming involves using at least two different materials having different optical and/or structural properties to make a component of the fixture in one or a limited number of manufacturing operations. Coextrusion is type of co-forming. For example a back and front surface of a part could be different materials co-formed or coextruded together. One of the two materials could be reflective or optically transmissive, while the other not, to serve various purposes. One could provide structural support while the other provides the appropriate optical characteristics. Desired characteristics may also be achieved by using a non-uniform distribution of one material relative to the other. These examples are but a few possibilities for the use of co-forming for light fixture components.

It would be beneficial in the pursuit of lower cost troffer-style recessed light fixtures to utilize a highly reflective plastic reflector, rather than a formed sheet metal component with a laminated diffuse white reflective film. Similarly, the pan or material used for a "troffer" to hold the light fixture in the ceiling could be a formed plastic. Also, the performance of such a fixture could also benefit from the improved reflectivity of a white surface designed for maximum optical efficiency. However, in recessed ceiling applications, there are additional requirements placed on the mechanical components exposed to the space above the ceiling plane.

Some buildings utilize ducted HVAC systems, where air return vents replace standard ceiling tiles, and ductwork carries the return air back to the heating and cooling systems. These are referred to as non-plenum ceilings. Increasingly however, new building construction utilizes plenum returns, where the entire air space above the ceiling is negatively pressured and draws return air either through light fixtures specially designed to allow air passage (called air return fixtures) or through slots in the ceiling grid system specifically placed to provide a return air path to the heating and cooling systems. From a lighting provider's perspective, these are "plenum-ceiling applications" or more simply "plenum applications."

Plastics utilized for mechanical components in the ceiling should either: a) not be used in plenum applications; or b) pass stringent regulatory requirements called out in the United States in National Fire Protection Association (NFPA) standard 90a ("Standard for Air-Conditioning and Ventilating Systems"). The test method for verification of these requirements is specified in NFPA 262, "Standard Method of Test for Flame Travel and Smoke of Wire and Cables." Under these standards, an arduous test is performed to verify compliance with a smoke propagation requirement. While many plastics are flame retardant and self-extinguishing, they still emit a large amount of smoke when an external flame source is used to burn them. In a plenum application, if a fire were to encounter a very smoke-prone plastic in the ceiling, smoke would be immediately be sucked into the HVAC system and circulated throughout the building, endangering the health and safety of people in the building as they attempting to exit.

Embodiments of the invention are enabled by the use of a plenum-rated plastic (such as Halar 558, a Cholortrifluouro-ethylene Polyethylene used in cable jacketing, Sabic Ultem™, a Polyetherimide (PEI), or Sabic Noryl™, a Polyphenylene Ether/Polystyrene blend, or a special PC or PC copolymer grade of plastic designed to pass the NFPA requirements) as a primary or extra barrier between the plenum space and a diffuse white material. An appropriate reflector may be made by co-forming, for example, comolding (using an injection molding process with two dissimilar materials), coextrusion (an extrusion process utilizing two dissimilar materials), lamination, overmolding, sonic welding, adhesive fastening, mechanical fastening and other methods, which for purposes of this disclosure may be referred to as co-forming, or making a co-formed component. The applications are numerous, including all types of lighting that require mechanical space above the ceiling plane including downlights, troffers, emergency lighting, etc. The reflective material can be, for example, Bayer Makrolon™ 6265X or FR6901, or Sabic™ BFL4000 or BFL2000.

Figure 1:
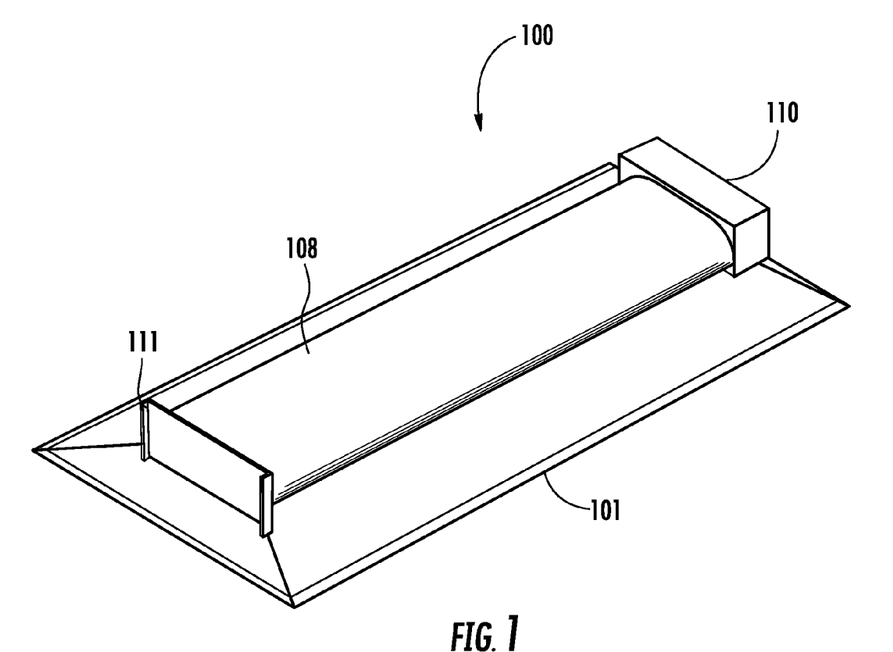
FIG. 1 is a top perspective view of a linear lighting system, more specifically, a troffer style light fixture according to at least some embodiments of the present invention.
Figure 2:
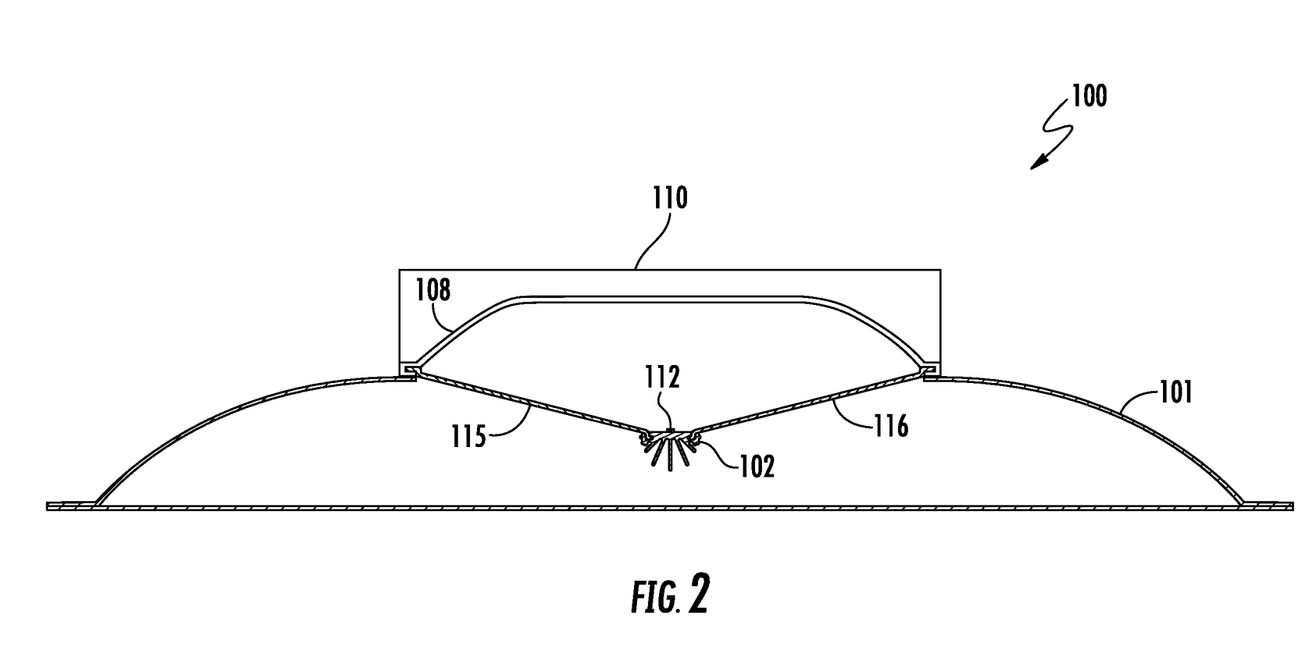
FIG. 2 is a cross-sectional view of the lighting system of FIG. 1.

FIG. 1 is a top perspective view of a light fixture 100, and FIG. 2 is a cross-sectional view of light fixture 100 according to example embodiments of the invention. Light fixture 100 is a linear fixture, which can be, as an example, a "troffer" style, in-ceiling linear light fixture. However, the co-formed reflector according to embodiments of the invention can work with square or any of other various shapes and styles of fixtures. Light fixture 100 includes pan 101, heatsink 102, reflector 108 and end caps 110 and 111. End cap 110 is larger than end cap 111 and is shaped to act as a circuit box to house electronics used to drive and control the light source such as rectifiers, regulators, timing circuitry, and other components.

In the example of FIGS. 1 and 2, reflector 108 includes a flat region opposite the mounting surface of the heatsink; however, a reflector for a troffer fixture according to embodiments of the invention can take various shapes. For example, reflector 108 could be parabolic in shape, or include two or more parabolic regions. Light fixture 100 includes LED devices and/or packages 112 to serve as a light source. Light fixture 100 also includes a diffuser lens assembly made up of two lens plates, 115 and 116, disposed at the sides of the heatsink.

Figure 3:
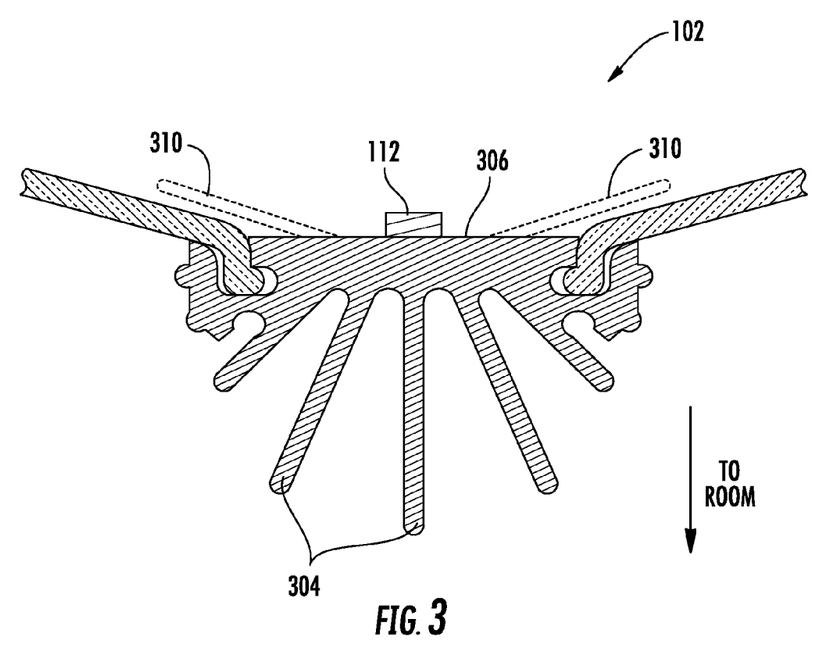
FIG. 3 is a cross-sectional view of the heatsink and light source for the lighting system of FIG. 1.

FIG. 3 is a close-up, cross-sectional view of the heatsink area of example light fixture 100 of FIG. 1, in which heatsink 102 and the light source are visible in some detail. It should be understood that FIG. 3 provides an example only as many different heatsink structures could be used with an embodiment of the present invention. The orientation of the heatsink relative to a room being illuminated is indicated. The topside portion of heatsink 102 faces the interior cavity of the light engine. Heatsink 102 includes fin structures 304 and mounting surface 306. The mounting surface 306 provides a substantially flat area on which LED devices 112 can be mounted for use as a light source.

The LED devices 112 of FIG. 3 can be mounted to face orthogonally to the mounting surface 306 to face the center region of the reflector, or they may be angled to face other portions of the reflector. In some embodiments, an optional baffle 310 (shown in dotted lines) may be included. The baffle 310 reduces the amount of light emitted from the LED light source at high angles that may escape the cavity of the light fixture without being reflected. Such baffling can help prevent hot spots or color spots visible when viewing the fixture at high viewing angles.

Figure 4:
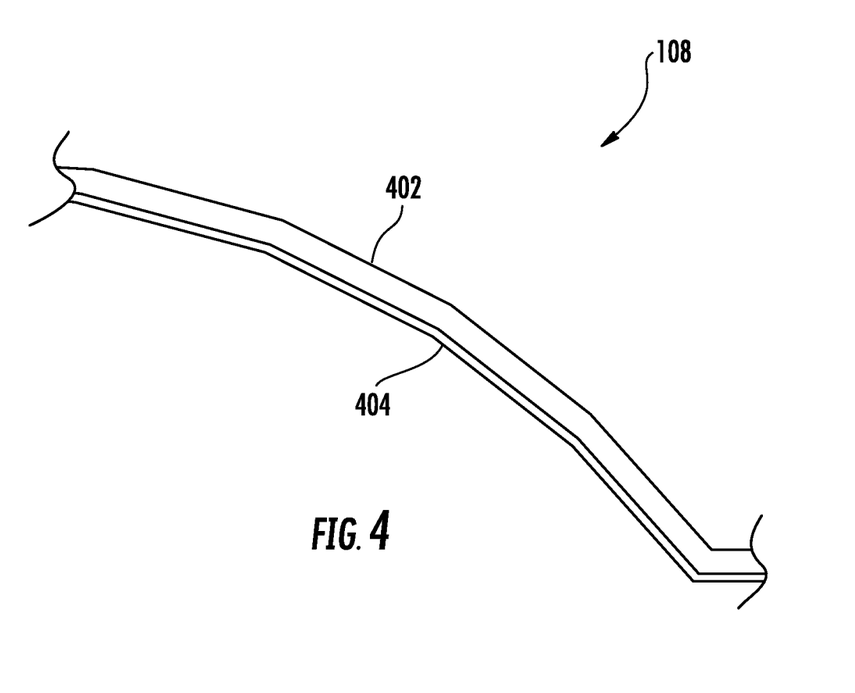
FIG. 4 is an enlarged, cross-sectional view of a portion of a coextruded plenum rated reflector of the lighting system of FIG. 1.

FIG. 4 illustrates a section of a reflector 108 for the troffer style light fixture of the previous figures, although again, a reflector of similar construction could be used in many different applications and may take any of various sizes and shapes. Material 402 is plenum rated plastic. In example embodiments, this material should be thick enough to pass the plenum smoke propagation tests, but no thicker than that, in order to minimize material cost. Material 404 is a diffuse white reflective plastic, examples of which have been previously discussed. In this example, the materials are shown as coextruded, but as noted there are many ways to co-form such a reflector to achieve the desired result of a low cost, plenum rated reflector for a troffer or other style of light fixture, lighting assembly, or lighting system.

Figure 5:
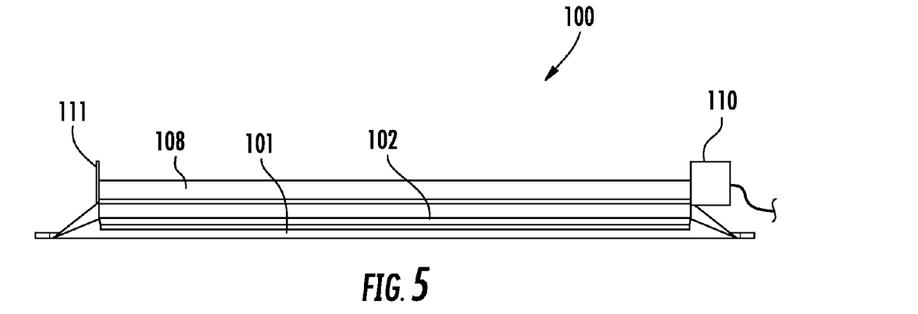
FIG. 5 is a cross-sectional side view of the troffer style light fixture of FIG. 1.
Figure 6:
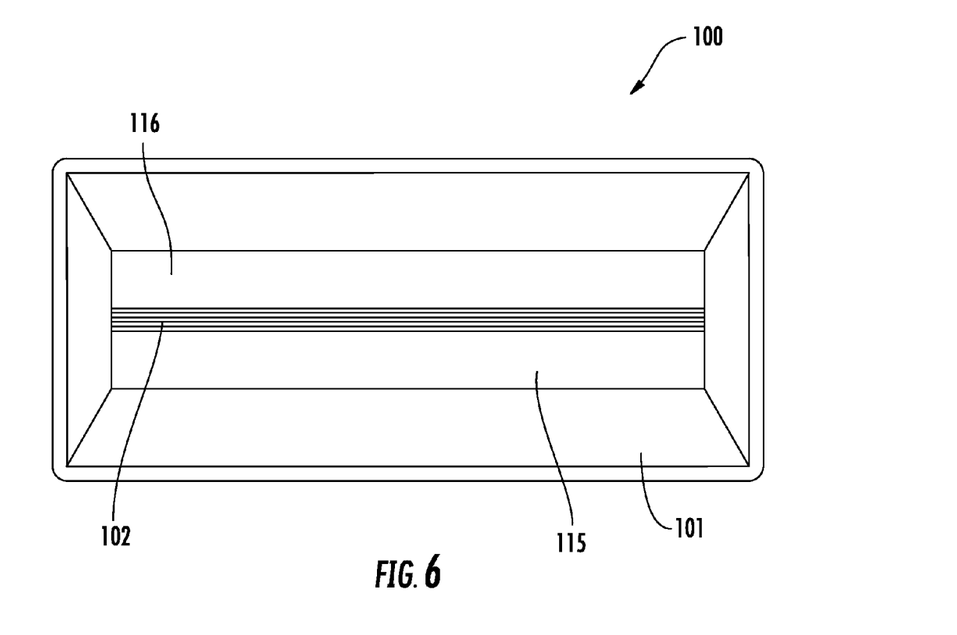
FIG. 6 is a bottom view of the troffer style light fixture of FIG. 1.

FIG. 5 is a cutaway side view of a light fixture 100, and FIG. 6 is a bottom view of light fixture 100, the in-ceiling troffer already discussed. Circuit box 110 can be seen at this angle attached to the backside of the light fixture. As previously mentioned, circuit box 110 houses electronics used to drive and control the light source and is attached to one end of co-formed reflector 108. Wiring from the circuit box to the light sources can be passed through holes or slots in heat sink 102. In FIG. 6, the reflector 108 is occluded from view by the lens plates 115 and 116 and the heatsink 102. In this view, the observer can appreciate that pan 101 is sized to fit around the reflector/heatsink/light source assembly (the light engine) and enable the fixture to be installed as a plenum-rated ceiling troffer.

It should be noted that the pan for troffer-style fixtures according to embodiments of the invention recesses the light engine portion of the fixture above the plane of a ceiling tile. Thus, if baffles are not included in the heatsink, the otherwise recessed light emitting portion of the fixture can create a light pattern such that a person occupying the illuminated space still cannot easily see the "source" of light by viewing the fixture from far away. However, recessing the light generation portion may also limit the ability of the luminaire to provide a wide distribution of light into the room. Nevertheless, by providing a slanted pan some light from the light engine may be incident on and illuminate the downside surface of the pan to improve the overall appearance of the fixture.

Figure 7:
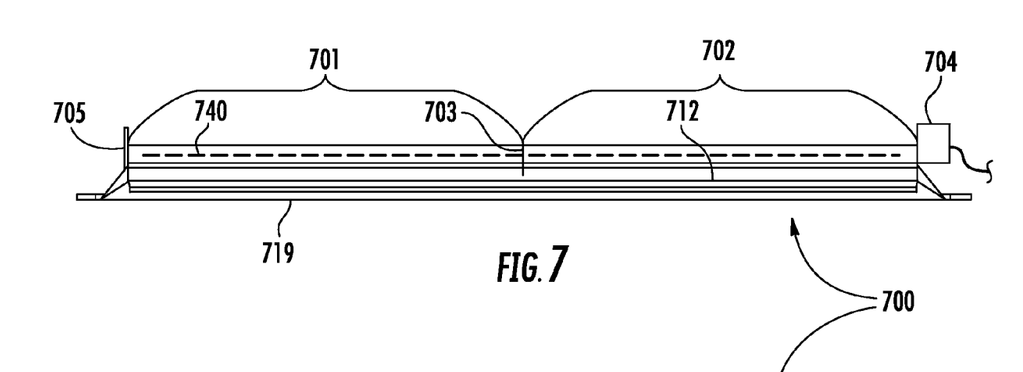
FIG. 7 is a cross-sectional side view of another troffer style light fixture according to example embodiments of the present invention.
Figure 8:
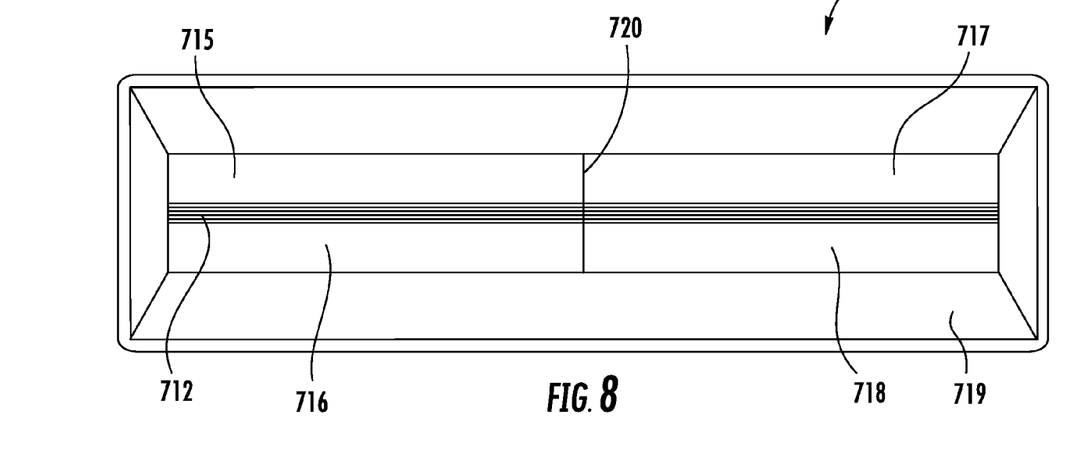
FIG. 8 is a bottom view of the troffer style light fixture of FIG. 7.

FIG. 7 is a cutaway side view of a linear light fixture 700, and FIG. 8 is a bottom view of light fixture 700. In the example embodiment of FIGS. 7 and 8, a longer light fixture is made by interconnecting complimentary elongated portions 701 and 702 of a co-formed reflector, which are adapted to be joined end-to-end at seam 703. End caps 704 and 705 provide support for the fixture. End cap 704 is larger than end cap 705 and is shaped to act as a circuit box to house electronics used to drive and control the light sources such as rectifiers, regulators, timing circuitry, and other components. Wiring from the end cap/circuit box to the light sources can be passed through holes or slots in heat sink 712. The reflector portions are occluded from view by the lens plates 715, 716, 717 and 718 and heatsink 712. The bottom side of heatsink 712 is exposed to the room environment. A one-piece pan, 719, supports the fixture; however, the lens plates are made up of portions joined at seam 720.

Still referring to FIGS. 7 and 8, depending on the materials, other supporting structures, and length of the fixture, a reinforcing member or members 740 (shown as dotted lines) can also be included in the fixture. For example, steel or aluminum rods or posts can be used as reinforcing members in the reflector of a light fixture according to example embodiments of the invention. It should be noted that although the light fixture of FIGS. 7 and 8 can be assembled from a reflector and lenses with elongated portions, and a unitary heatsink and/or pan, the same style and size of fixture can also be assembled where all the parts include multiple portions. For example, the heatsink could be made of elongated portions, which are adapted to be joined end-to-end. More than two elongated portions of the reflector or any other parts of the fixture can also be used. In an embodiment where portions of a lens assembly are joined end-to-end, it might be said that four lens plates are used, although one could still consider such an embodiment as having two lens plates where each includes two portions. Various other designs using other numbers of lens plates or reflector portions can be devised as an embodiment of the present invention.

Multi-chip LED packages used with an embodiment of the invention and can include light emitting diode chips that emit hues of light that, when mixed, are perceived in combination as white light. Phosphors can also be used. Blue or violet LEDs can be used in the LED assembly of a lamp and the appropriate phosphor can be deployed on a carrier within the fixture. The reflector of the fixture could also be coated with a phosphor to provide remote wavelength conversion. LED devices can include phosphorized coatings packaged locally with the LEDs to create various colors of light. For example, blue-shifted yellow (BSY) LED devices can be used with a red phosphor on or in a carrier or on the reflector to create substantially white light, or combined with red emitting LED devices on the heatsink to create substantially white light. Such embodiments can produce light with a CRI of at least 70, at least 80, at least 90, or at least 95. By use of the term substantially white light, one could be referring to a chromacity diagram including a blackbody locus of points, where the point for the source falls within four, six or ten MacAdam ellipses of any point in the blackbody locus of points.

A lighting system using the combination of BSY and red LED devices referred to above to make substantially white light can be referred to as a BSY plus red or "BSY+R" system. In such a system, the LED devices used include LEDs operable to emit light of two different colors. In one example embodiment, the LED services include a group of LEDs, wherein each LED, if and when illuminated, emits light having dominant wavelength from 440 to 480 nm. The LED devices include another group of LEDs, wherein each LED, if and when illuminated, emits light having a dominant wavelength from 605 to 630 nm. Each of the former, blue LEDs are packaged with a phosphor that, when excited, emits light having a dominant wavelength from 560 to 580 nm, so as to form a blue-shifted-yellow LED device. In another example embodiment, one group of LEDs emits light having a dominant wavelength of from 435 to 490 nm and the other group emits light having a dominant wavelength of from 600 to 640 nm. The phosphor, when excited, emits light having a dominant wavelength of from 540 to 585 nm. A further detailed example of using groups of LEDs emitting light of different wavelengths to produce substantially while light can be found in issued U.S. Pat. No. 7,213,940, which is incorporated herein by reference.

The various parts of an LED fixture according to example embodiments of the invention can be made of any of various materials. Heatsinks can be made of metal or plastic, as can the various portions of the housings for the components of a fixture. A fixture according to embodiments of the invention can be assembled using varied fastening methods and mechanisms for interconnecting the various parts. For example, in some embodiments locking tabs and holes can be used. In some embodiments, combinations of fasteners such as tabs, latches or other suitable fastening arrangements and combinations of fasteners can be used, which would not require adhesives or screws. In other embodiments, adhesives, screws, bolts, or other fasteners may be used to fasten together the various components.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:
1. A ceiling fixture comprising:
a co-formed plenum rated reflector further comprising a reflective material and a plastic arranged to act as a barrier between a plenum space above the ceiling fixture and the reflective material; and
a plurality of LEDs positioned on a heatsink so that at least a portion of the light from the plurality of LEDs is reflected from the co-formed, plenum rated reflector.

2. The ceiling fixture of claim 1 wherein the co-formed, plenum rated reflector is coextruded.

3. The ceiling fixture of claim 2 wherein the plastic further comprises a plenum rated plastic and the reflective material further comprises a diffuse, white reflective material.

4. The ceiling fixture of claim 2 wherein the plurality of LEDs further comprises at least two groups of LEDs, wherein one group, if illuminated, would emit light having a dominant wavelength from 435 to 490 nm, and another group, if illuminated, would emit light having a dominant wavelength from 600 to 640 nm, one group being packaged with a phosphor, which, when excited, emits light having a dominant wavelength from 540 to 585 nm.

5. The ceiling fixture of claim 4 wherein the one group, if illuminated, would emit light having a dominant wavelength from 440 to 480 nm, and the other group, if illuminated, would emit light having a dominant wavelength from 605 to 630 nm, one group being packaged with a lumiphor, which, when excited, emits light having a dominant wavelength from 560 to 580 nm.

6. The ceiling fixture of claim 1 further comprising a lens including at least two lens plates.

7. The ceiling fixture of claim 6 further comprising a pan disposed outside the co-formed, plenum rated reflector.

8. The ceiling fixture of claim 7 wherein the plurality of LEDs further comprises at least two groups of LEDs, wherein one group, if illuminated, would emit light having a dominant wavelength from 435 to 490 nm, and another group, if illuminated, would emit light having a dominant wavelength from 600 to 640 nm, one group being packaged with a phosphor, which, when excited, emits light having a dominant wavelength from 540 to 585 nm.

9. The ceiling fixture of claim 8 wherein the one group, if illuminated, would emit light having a dominant wavelength from 440 to 480 nm, and the other group, if illuminated, would emit light having a dominant wavelength from 605 to 630 nm, one group being packaged with a lumiphor, which, when excited, emits light having a dominant wavelength from 560 to 580 nm.

10. The ceiling fixture of claim 9 wherein the co-formed, plenum rated reflector comprises at least two elongated portions adapted to be joined end-to-end.

11. The ceiling fixture of claim 10 wherein the co-formed, plenum rated reflector comprises reinforcing members.

12. A co-formed reflector for a ceiling fixture, the co-formed, plenum rated reflector comprising:
a reflective material; and
a plenum rated plastic arranged to act as a barrier between a plenum space above the ceiling fixture and the reflective material, the reflective material co-formed with the plenum rated plastic;
wherein the co-formed, plenum rated reflector is adapted to receive light from a plurality of LEDs on a heat sink so that at least a portion of the light from the plurality of LEDs is reflected from the co-formed, plenum rated reflector.

13. The co-formed, plenum rated reflector of claim 12 wherein the plenum rated plastic and the reflective material are coextruded.

14. The co-formed, plenum rated reflector of claim 13 wherein the plenum rated plastic comprises at least one of polyetherimide, a polyphenylene ether/polystyrene blend, polycarbonate and polycarbonate copolymer.

15. The co-formed, plenum rated reflector of claim 13 further comprising at least two elongated portions adapted to be joined end-to-end.

16. The co-formed, plenum rated reflector of claim 14 further comprising reinforcing members.

17. A method of assembling a ceiling fixture, the method comprising:
   co-forming a plenum rated reflector, the plenum rated reflector further comprising a reflective material and a plastic arranged to act as a barrier between a plenum space above the ceiling fixture and the reflective material;
   fixing a plurality of LED devices to a heatsink to serve as a source of light for the light fixture; and
   positioning the heatsink with the light source so that at least a portion of the light is reflected from the plenum rated reflector.

18. The method of claim 17 wherein the co-forming of the reflector further comprises coextruding the reflective material and the plastic.

19. The method of claim 18 wherein the reflector comprises two, complimentary elongated portions and further comprising joining the two, complimentary elongated portions end-to-end.

20. The method of claim 19 further comprising including reinforcing members in the reflector.

21. The method of claim 18 wherein the plastic comprises at least one of polyetherimide, a polyphenylene ether/polystyrene blend, a polycarbonate and a polycarbonate copolymer.

22. The method of claim 18 further comprising positioning two lens plates at the sides of the heatsink.

23. The method of claim 22 further comprising installing a pan outside the plenum rated reflector.

24. The method of claim 23 wherein the plurality of LED devices further comprises at least two groups of LEDs, wherein one group, if illuminated, would emit light having a dominant wavelength from 435 to 490 nm, and another group, if illuminated, would emit light having a dominant wavelength from 600 to 640 nm, one group being packaged with a phosphor, which, when excited, emits light having a dominant wavelength from 540 to 585 nm.

25. The method of claim 24 wherein the one group, if illuminated, would emit light having a dominant wavelength from 440 to 480 nm, and the other group, if illuminated, would emit light having a dominant wavelength from 605 to 630 nm, one group being packaged with a lumiphor, which, when excited, emits light having a dominant wavelength from 560 to 580 nm.

26. The ceiling fixture of claim 6 wherein the heatsink further comprises a plurality of fin structures.

* * * * *